US012577742B2

(12) United States Patent
Sugawara et al.

(10) Patent No.: US 12,577,742 B2
(45) Date of Patent: Mar. 17, 2026

(54) ROAD SURFACE MANAGEMENT DEVICE, ROAD SURFACE MANAGEMENT METHOD, AND RECORDING MEDIUM

(71) Applicant: NEC Corporation, Tokyo (JP)

(72) Inventors: Chisato Sugawara, Tokyo (JP); Nana Jumonji, Tokyo (JP); Yosuke Kimura, Tokyo (JP); Maiko Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 417 days.

(21) Appl. No.: 18/022,410

(22) PCT Filed: Sep. 29, 2020

(86) PCT No.: PCT/JP2020/036770
§ 371 (c)(1),
(2) Date: Feb. 21, 2023

(87) PCT Pub. No.: WO2022/070230
PCT Pub. Date: Apr. 7, 2022

(65) Prior Publication Data
US 2023/0357998 A1 Nov. 9, 2023

(51) Int. Cl.
*G06V 20/56* (2022.01)
*E01C 23/01* (2006.01)
(Continued)

(52) U.S. Cl.
CPC .............. *E01C 23/01* (2013.01); *G06V 10/26* (2022.01); *G06V 10/993* (2022.01); *G06V 20/182* (2022.01)

(58) Field of Classification Search
CPC ...... E01C 23/01; G06V 20/182; G06V 10/26; G06V 10/993
See application file for complete search history.

(56) References Cited

U.S. PATENT DOCUMENTS

| | | | |
|---|---|---|---|
| 2017/0011270 A1* | 1/2017 | Kamada ........... | G08G 1/096775 |
| 2018/0195973 A1* | 7/2018 | Yonekawa ............. | G01B 11/30 |
| 2019/0035101 A1* | 1/2019 | Kwant ...................... | G06T 7/12 |

FOREIGN PATENT DOCUMENTS

| | | |
|---|---|---|
| JP | 2006-258486 A | 9/2006 |
| JP | 2013-167494 A | 8/2013 |

(Continued)

OTHER PUBLICATIONS

International Search Report for PCT Application No. PCT/JP2020/036770, mailed on Dec. 15, 2020.
(Continued)

*Primary Examiner* — Ross Varndell
*Assistant Examiner* — Nhut Huy Pham
(74) *Attorney, Agent, or Firm* — Sughrue Mion, PLLC

(57) ABSTRACT

A road surface management device according to an aspect of the present disclosure includes: at least one memory configured to store instructions; and at least one processor configured to execute the instructions to: identify a section in which an image is captured, among a plurality of sections obtained by dividing a traveling road of an airport, based on positional relationships between the plurality of sections and signs, and signs in the image included in sensor information collected on the traveling road; detect an abnormality of the traveling road in the identified section based on the collected sensor information; and output the detected abnormality in association with the identified section.

9 Claims, 18 Drawing Sheets

ROAD SURFACE MANAGEMENT SYSTEM

(51) Int. Cl.
    *G06V 10/26*    (2022.01)
    *G06V 10/98*    (2022.01)
    *G06V 20/10*    (2022.01)

(56)             References Cited

FOREIGN PATENT DOCUMENTS

| JP | 2019-070254 A | | 5/2019 |
|----|---------------|---|--------|
| JP | 2019082377 A | * | 5/2019 |
| JP | 2020-056303 A | | 4/2020 |
| WO | 2018/037689 A1 | | 3/2018 |
| WO | 2020/022042 A1 | | 1/2020 |
| WO | 2020/154004 A2 | | 7/2020 |

OTHER PUBLICATIONS

English translation of Written opinion for PCT Application No. PCT/JP2020/036770, mailed on Dec. 15, 2020.

* cited by examiner

Fig. 1

ROAD SURFACE MANAGEMENT SYSTEM

10

ROAD SURFACE MANAGEMENT DEVICE

| SENSOR INFORMATION | | | | | |
|---|---|---|---|---|---|
| SENSOR INFORMATION ID | ACQUISITION DATE AND TIME | ACQUISITION SECTION | IMAGE INFORMATION | | ACCELERATION INFORMATION |
| | | | IMAGE 1 | IMAGE 2 | |
| D101 | T11 | RW01b | IDM101 | IDS101 | AD101 |
| ‥ | ‥ | ‥ | ‥ | ‥ | ‥ |
| D301 | T31 | RW03b | IDM301 | IDS301 | AD301 |
| ‥ | ‥ | ‥ | ‥ | ‥ | ‥ |

Fig. 3

| SENSOR INFORMATION ID | SENSOR INFORMATION | | | | | DETECTION INFORMATION | | |
| | ACQUISITION DATE AND TIME | ACQUISITION SECTION | IMAGE INFORMATION | | ACCELERATION INFORMATION | ABNORMALITY FLAG | DETECTION TYPE | DETECTION STATE |
| | | | IMAGE 1 | IMAGE 2 | | | | |
|---|---|---|---|---|---|---|---|---|
| D101 | T11 | RW01b | IDM101 | IDS101 | AD101 | N | – | – |
| .. | .. | .. | .. | .. | .. | .. | .. | .. |
| D301 | T31 | RW03b | IDM301 | IDS301 | AD301 | Y | CRACK | CRACK RATE 33.3% |
| .. | .. | .. | .. | .. | .. | .. | .. | .. |

DETECTION RESULT

RUNWAY CENTERLINE SIGN CL

LANDING ZONE SIGN TL

L01+R01

INDICATOR SIGN ND

Fig. 6

| TRAVELING ROAD TYPE | SIGN INFORMATION | | | | |
|---|---|---|---|---|---|
| | SIGN TYPE | TRANSVERSE-DIRECTION LENGTH | LONGITUDINAL-DIRECTION LENGTH | REPEATED INTERVAL | SIGN IMAGE |
| RW | RUNWAY CENTERLINE SIGN | W01 | L01 | R01 | ID001 |
| RW | LANDING ZONE SIGN | W02 | L02 | R02 | ID002 |
| RW | INDICATOR SIGN | W03 | L03 | – | ID003 |
| ·· | ·· | ·· | ·· | ·· | ·· |
| TW | TAXIWAY CENTERLINE SIGN | W10 | L10 | R10 | ID010 |
| ·· | ·· | ·· | ·· | ·· | ·· |
| AP | INTRODUCTION LINE | W20 | L20 | 0 | ID020 |
| ·· | ·· | ·· | ·· | ·· | ·· |

DETECTION RESULT DISPLAY PROCESS

START

ACQUIRE SENSOR INFORMATION — S11

PERFORM SECTION IDENTIFICATION PROCESS — S12

DETECT ABNORMALITY — S13

DISPLAY DETECTION RESULT SCREEN — S14

END

Fig. 9

LONGITUDINAL-DIRECTION IMAGE

RUNWAY CENTERLINE
SIGN CL

VIRTUAL LINE DL

L=W/4

END OF RUNWAY

W/2

SECTION IDENTIFICATION PROCESS (S12)
(LONGITUDINAL DIRECTION)

START

ACQUIRE TRANSVERSE-DIRECTION IMAGE — S1221

IDENTIFY LONGITUDINAL-DIRECTION REFERENCE SIGN — S1222

CALCULATE RELATIVE DISTANCE — S1223

IDENTIFY LONGITUDINAL-DIRECTION SECTION — S1224

END

CURRENT SECTION DISPLAY PROCESS

START

ACQUIRE DETECTION RESULT SCREEN — S21

DISPLAY DETECTION RESULT SCREEN — S22

ACQUIRE SENSOR INFORMATION — S23

PERFORM SECTION IDENTIFICATION PROCESS — S24

DISPLAY CURRENT SECTION — S25

ROAD SURFACE MANAGEMENT DEVICE, ROAD SURFACE MANAGEMENT METHOD, AND RECORDING MEDIUM

This application is a National Stage Entry of PCT/JP2020/036770 filed on Sep. 29, 2020, the contents of all of which are incorporated herein by reference, in their entirety.

TECHNICAL FIELD

The present disclosure relates to a road surface management device, a road surface management method, and a recording medium.

BACKGROUND ART

In an airport, it is necessary to maintain and inspect equipment such as illuminations and guide lights, signs, and abnormalities such as cracks on a road surface of a runway, an apron, or the like where an aircraft moves (hereinafter, also collectively referred to as a traveling road). For example, a crack, a pot hole, or a foreign substance (an asphalt fragment generated by the crack, the pot hole, or the like), which is an abnormality of asphalt on the traveling road, may cause an accident when the aircraft is taking off or landing. In addition, an abnormality of the equipment may also cause a pilot to make a misjudgment, leading to a serious aircraft accident.

The maintenance and the inspection of the road surface and the equipment on the traveling road are important tasks indispensable for the safe flight of the aircraft, and have been mainly performed visually by airport staff.

However, especially in a local airport, personnel for maintenance and inspection are limited, and it is burdensome for airport staff to visually observe a traveling road for maintenance and inspection.

Therefore, there has been a demand for automating the maintenance and inspection of the traveling road in the airport.

For example, PTL 1 discloses a road surface property investigation device that detects an abnormality of a road surface of a traveling road using a high-density laser scanner and a visible image capturing camera mounted on a road surface property investigation device vehicle.

CITATION LIST

Patent Literature

[PTL 1] JP 2019-070254 A

SUMMARY OF INVENTION

Technical Problem

In a case where the road surface property investigation device as described in PTL 1 is used, an airport staff member needs to go to a place where an abnormality is detected by the road surface property investigation device to check and repair the abnormality of the road surface. In this case, it is preferable that the traveling road is managed so that the airport staff member easily identifies the position at which the abnormality is detected on the traveling road. Generally, a traveling road of an airport is wide and long, and has no intersections, adjacent buildings, and the like unlike a general road, which makes it difficult to identify a position on the traveling road. In PTL 1, an abnormality-detected position is identified by a global positioning system (GPS), but in certain cases, an abnormality-detected position may not be identified with sufficient accuracy depending on what GPS satellite or position measurement device is available.

An object of the present disclosure is to solve the above-described problems and to provide a road surface management device, a road surface management method, a terminal device, and a recording medium capable of managing a traveling road of an airport so that an abnormality-detected position can be easily identified on the traveling road with high accuracy.

Solution to Problem

A road surface management device according to an aspect of the present disclosure includes: an identification means configured to identify a section in which an image is captured, among a plurality of sections obtained by dividing a traveling road of an airport, based on positional relationships between the plurality of sections and signs, and signs in the image included in sensor information collected on the traveling road; a detection means configured to detect an abnormality of the traveling road in the identified section based on the collected sensor information; and an output means configured to output the detected abnormality in association with the identified section.

A terminal device according to an aspect of the present disclosure includes: a reception means configured to receive an abnormality detected on a traveling road of an airport, and a section in which the abnormality is detected among a plurality of sections obtained by dividing the traveling road; an identification means configured to identify a section in which an image is captured among the plurality of sections, based on positional relationships between the plurality of sections and signs, and signs in the image captured by the terminal device or a moving object on which the terminal device is mounted; and a display means configured to display the section in which the image is captured and the section in which the abnormality is detected in the plurality of sections.

A road surface management method according to an aspect of the present disclosure includes: identifying a section in which an image is captured, among a plurality of sections obtained by dividing a traveling road of an airport, based on positional relationships between the plurality of sections and signs, and signs in the image included in sensor information collected on the traveling road; detecting an abnormality of the traveling road in the identified section based on the collected sensor information; and outputting the detected abnormality in association with the identified section.

A recording medium according to an aspect of the present disclosure records a program for causing a computer to execute: identifying a section in which an image is captured, among a plurality of sections obtained by dividing a traveling road of an airport, based on positional relationships between the plurality of sections and signs, and signs in the image included in sensor information collected on the traveling road; detecting an abnormality of the traveling road in the identified section based on the collected sensor information; and outputting the detected abnormality in association with the identified section.

Advantageous Effects of Invention

An effect of the present disclosure is that it is possible to manage a traveling road of an airport so that an abnormality-detected position can be easily identified on the traveling road with high accuracy.

BRIEF DESCRIPTION OF DRAWINGS

FIG. 1 is a diagram illustrating a configuration of a road surface management system 10 according to a first example embodiment.

FIG. 2 is a diagram illustrating an example of sensor information according to the first example embodiment.

FIG. 3 is a diagram illustrating an example of a detection result according to the first example embodiment.

FIG. 6 is a diagram illustrating an example of sign information according to the first example embodiment.

FIG. 9 is a diagram illustrating an example of a method of identifying a transverse-direction section according to the first example embodiment.

EXAMPLE EMBODIMENT

Figure 4:
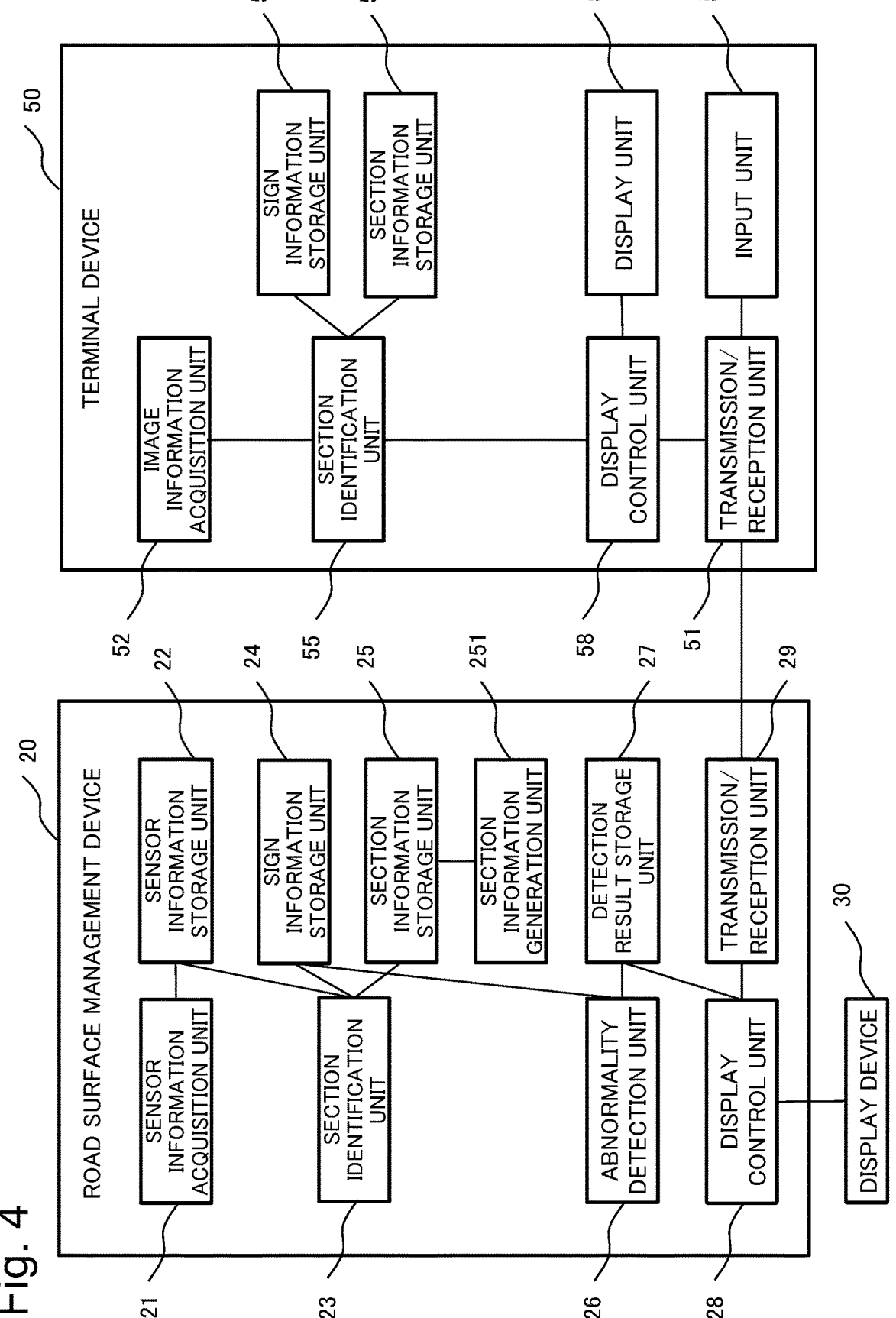
FIG. 4 is a block diagram illustrating configurations of a road surface management device 20 and a terminal device 50 according to the first example embodiment.

Example embodiments will be described in detail with reference to the drawings. Note that, in the drawings and the example embodiments described in the specification, the same components will be denoted by the same reference signs, and the description thereof will be appropriately omitted.

First Example Embodiment

A first example embodiment will be described.

Figure 1:
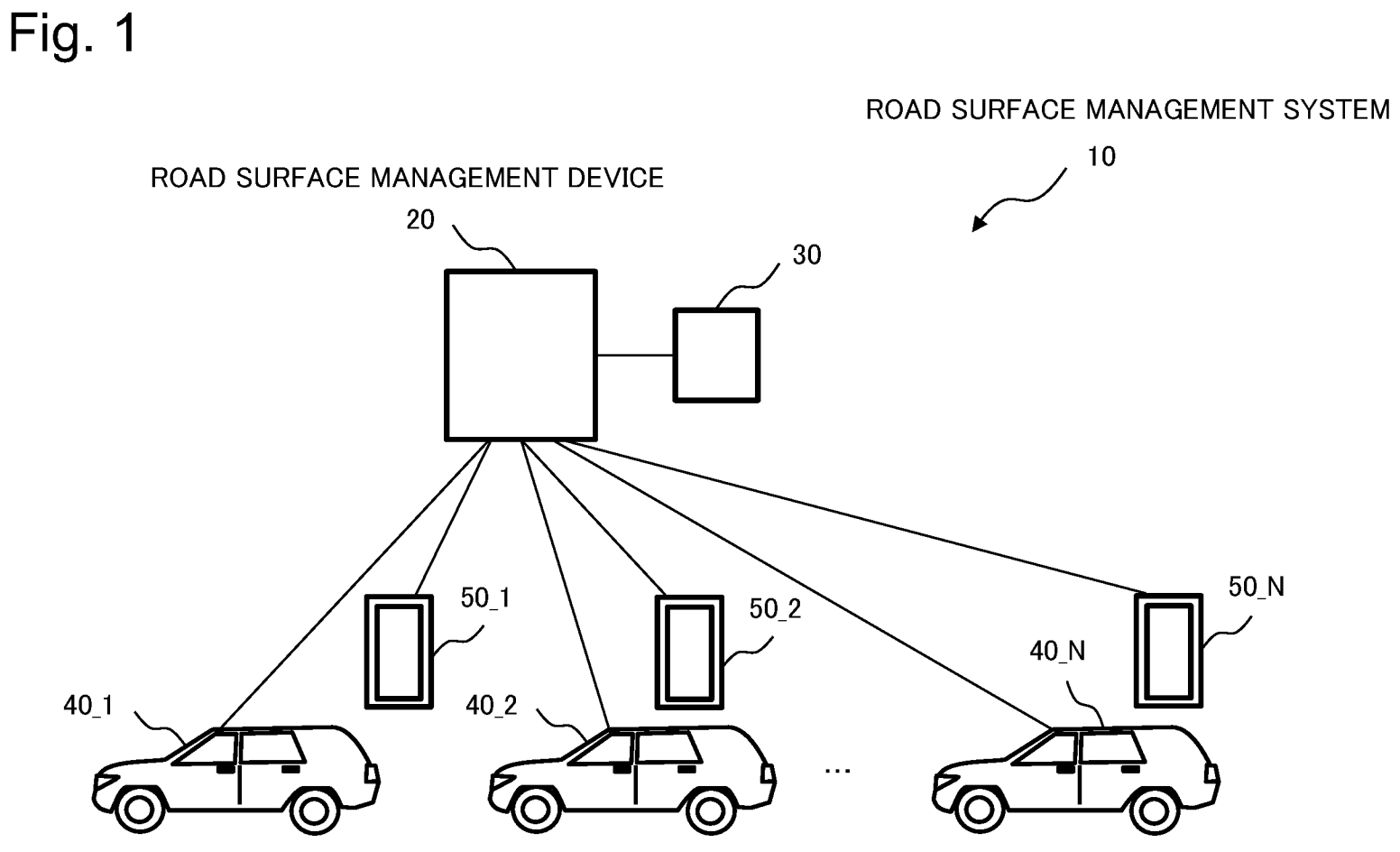

First, an overall configuration of a road surface management system according to the first example embodiment will be described. FIG. 1 is a diagram illustrating a configuration of a road surface management system 10 according to a first example embodiment. Referring to FIG. 1, the road surface management system 10 includes a road surface management device 20, a display device 30, a plurality of vehicles 40_1, 40_2, . . . , and 40_N (N is a natural number) (hereinafter, collectively referred to as the vehicle 40), and terminal devices 50_1, 50_2, . . . , and 50_N (hereinafter, collectively referred to as the terminal device 50). The terminal devices 50_1, 50_2, . . . , and 50_N are mounted on the vehicles 40_1, 40_2, . . . , and 40_N, respectively. Note that the terminal device 50 may be detachably mounted on the vehicle 40. In this case, the terminal device 50 can operate alone when not mounted on the vehicle 40.

The road surface management device 20 is connected to the vehicle 40 and the terminal device 50 via a communication network or the like.

The vehicle 40 captures an image of a traveling road of an airport while traveling on the traveling road through an image sensor such as a camera of a drive recorder to acquire image information. In addition, the vehicle 40 detects an acceleration (vibrations in a vertical direction) through an acceleration sensor while traveling on the traveling road to acquire acceleration information. Here, the traveling road is, for example, a runway of the airport. Furthermore, the traveling road may be an apron or a taxiway of the airport.

The vehicle 40 includes a main camera and a side camera as image sensors. The main camera acquires an image in a forward direction of the vehicle 40. The side camera acquires an image in a sideward direction of the vehicle 40. Note that the main camera may acquire images in the forward direction and in the sideward direction. Furthermore, the main camera may be a 360-degree camera that acquires images in all directions.

While traveling on the traveling road in a longitudinal direction, the vehicle 40 generates image information including an image of the traveling road in the longitudinal direction (in the forward direction of the vehicle 40) through the main camera and an image of the traveling road in a transverse direction (in the sideward direction of the vehicle 40) through the side camera. The longitudinal direction is, for example, a traveling direction of a main traveling entity of the traveling road, such as a running direction of an aircraft on the runway (a longitudinal direction of the runway). The transverse direction is a direction perpendicular to the traveling direction. Note that the vehicle 40 is not limited thereto, and may acquire a transverse-direction image of the traveling road through the main camera and a longitudinal-direction image of the traveling road through the side camera while traveling on the traveling road in the transverse direction.

The vehicle 40 transmits sensor information including image information, acceleration information, and date and time when such information is acquired to the road surface management device 20.

The road surface management device 20 and the display device 30 are arranged, for example, in an equipment management facility of the airport. The road surface management device 20 and the display device 30 may be integrally or separately formed. Alternatively, the road surface management device 20 may be disposed in a place other than the equipment management facility of the airport. In this case, the road surface management device 20 may be achieved by a cloud computing system.

The road surface management device 20 analyzes the sensor information to detect an abnormality in a region to be managed on the traveling road of the airport. Hereinafter, the region to be managed on the traveling road will be simply referred to as the traveling road. The traveling road is divided into a plurality of sections as will be described below.

The road surface management device 20 analyzes an image included in the image information among the sensor information transmitted from each vehicle 40, and identifies a section in which the image is captured among the plurality of sections obtained by dividing the traveling road. The road surface management device 20 sets the identified section in the sensor information. Further, the road surface management device 20 analyzes the sensor information to detect an abnormality of the traveling road. Here, as the abnormality of the traveling road, the road surface management device 20 detects a deterioration of the road surface such as a "crack", a "rut", a "pot hole", or an "abnormality in flatness" generated on the road surface of the traveling road, or a foreign matter on the road surface (a falling object, an asphalt fragment resulting from the deterioration of the road surface, or the like). The road surface management device 20 may detect not only an abnormality of the road surface but also an abnormality of a facility (such as a guide light or a lamp) on the traveling road.

As a method for detecting an abnormality of the traveling road based on the sensor information, a known technique is used. The road surface management device 20 outputs an abnormality detection result to a staff member of the equipment management facility of the airport via the display device 30 and the terminal device 50.

FIG. 2 is a diagram illustrating an example of sensor information according to the first example embodiment. As illustrated in FIG. 2, the sensor information includes a sensor information identification (ID), an acquisition date and time, an acquisition section, image information, and acceleration information.

The sensor information ID is an ID for identifying each piece of sensor information. The sensor information ID is assigned, for example, by the vehicle 40.

The acquisition section indicates a section in which the sensor information is acquired. The acquisition section is set by the road surface management device 20 through a section identification process to be described below.

As illustrated in FIG. 2, the image information includes a longitudinal-direction image 1 and a transverse-direction image 2.

FIG. 3 is a diagram illustrating an example of a detection result according to the first example embodiment. The detection result indicates a result of detecting an abnormality of the road surface by the road surface management device 20. As illustrated in FIG. 3, the detection result includes the above-described sensor information and detection information. The detection information includes an abnormality flag, a detection type, and a detection state.

The abnormality flag indicates whether an abnormality has been detected (Y) or no abnormality has been detected (N) with respect to the sensor information.

The detection type indicates a detected abnormality type. Examples of types of abnormalities include a "crack", a "rut", a "pot hole", a "foreign matter", and an "abnormality in flatness" generated on the runway.

The detection state indicates a degree of deterioration by detection type. As the degree of deterioration, for example, a crack rate is used for the detection type "crack", and a rutting amount or the like is used for the detection type "rut". In addition, for example, an international roughness index (IRI) may be used for the detection type "abnormality in flatness". In addition, as the degree of deterioration, a maintenance control index (MCI) may be used. The MCI is a composite deterioration index obtained from a crack rate, a rutting amount, flatness, and the like.

The terminal device 50 displays an abnormality detection result and a section where the vehicle 40 on which the terminal is mounted is currently located. A staff member of the equipment management facility goes to a point where the abnormality of the traveling road is detected with reference to the section where the vehicle 40 is currently located as displayed on the terminal device 50, checks the abnormality of the traveling road, and performs maintenance.

Note that, although the present example embodiment is described for a case where the moving object transmitting sensor information is a vehicle 40, the moving object may be a bicycle, a drone, a robot or a vehicle having an automatic driving function, or a person as long as it is capable of acquiring sensor information and transmitting the sensor information to the road surface management device 20.

In addition, although the present example embodiment is described for a case where the target from which an abnormality is to be detected based on sensor information is a pavement of the traveling road, the target from which an abnormality is to be detected may be a guide light or a lamp installed on the traveling road. In this case, a guide light or a lamp is used as the above-described detection type.

Next, configurations of the road surface management device 20 and the terminal device 50 according to the first example embodiment will be described. FIG. 4 is a block diagram illustrating configurations of the road surface management device 20 and the terminal device 50 according to the first example embodiment.

As illustrated in FIG. 4, the road surface management device 20 includes a sensor information acquisition unit 21, a sensor information storage unit 22, a section identification unit 23, a sign information storage unit 24, a section information storage unit 25, a section information generation unit 251, an abnormality detection unit 26, a detection result storage unit 27, a display control unit 28, and a transmission/reception unit 29.

The sensor information acquisition unit 21 acquires sensor information from the vehicle 40. The sensor information acquisition unit 21 outputs the acquired sensor information to the sensor information storage unit 22.

The sensor information storage unit 22 stores the sensor information output by the sensor information acquisition unit 21.

The section identification unit 23 performs a section identification process for identifying a section in which an image included in the sensor information is captured using section information and sign information. The section identification unit 23 sets the identified section in the sensor information.

The section information storage unit 25 stores section information for the traveling road by type (hereinafter, also referred to as a traveling road type) such as a runway, an apron, or a taxiway.

The section information indicates a positional relationship between each section and a sign on the traveling road divided into a plurality of sections. Here, the traveling road is divided into, for example, rectangular sections each having a specific size along the traveling direction of the traveling road. The sign includes one or more road surface signs such as an indicator sign drawn on the traveling road, a landing zone sign, a runway centerline sign, a runway light, and a runway centerline light.

Figure 5:
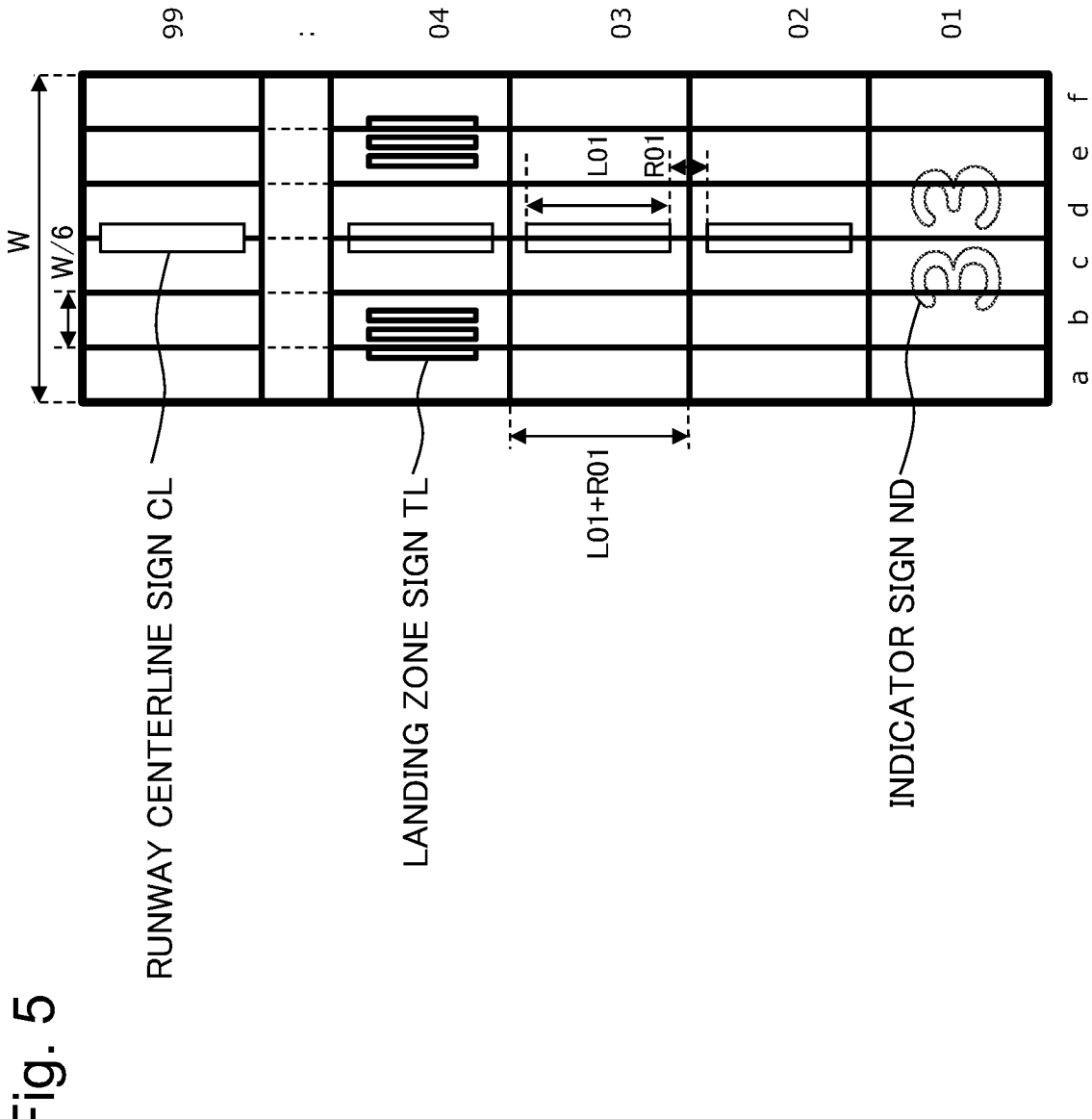
FIG. 5 is a diagram illustrating an example of a positional relationship indicated by section information according to the first example embodiment.

FIG. 5 is a diagram illustrating an example of a positional relationship indicated by section information according to the first example embodiment. FIG. 5 illustrates an example in which the traveling road is a runway. In the example of FIG. 5, the traveling road is divided into rectangular sections along the longitudinal direction (traveling direction). Here, a longitudinal-direction length of a section is set to a length (L01+R01) obtained by adding a sign interval (R01) to a longitudinal-direction length (L01) of a runway centerline sign CL. In addition, a transverse-direction length of a section is set to a length (W/6) obtained by dividing a transverse-direction length W of the traveling road into six equal parts. Further, a boundary between the longitudinal-direction sections is set to be the center between adjacent runway centerline signs, and a boundary between the transverse-direction sections is set such that one ends of the two outermost sections are in contact with the respective ends of the traveling road. Then, a section ID for identifying each section on the traveling road is assigned to each section. The section ID includes, for example, symbols a to f indicating transverse positions of the sections and symbols 01 to 99 indicating longitudinal positions of the sections of the traveling road by type (runway (RW), taxiway (TW), or apron (AP)).

The section information may be set in advance by a staff member or the like, for example, based on a drawing of the traveling road or an image of the traveling road such as a satellite picture or an aerial picture. The image of the traveling road may be an image obtained from an image captured by the vehicle 40 while traveling on the traveling road.

In addition, the section information generation unit 251 may generate section information based on the drawing or the image of the traveling road. In this case, the section information generation unit 251 generates section information by dividing the traveling road into a plurality of sections and extracting positional relationships between the plurality of sections and signs. The section information generation unit 251 may determine the transverse-direction length and the longitudinal-direction length of each section so that each section is a region in which predetermined image quality can be obtained, such as a non-distorted region (a region in which an abnormality of the road surface is properly detected), for example, in an image obtained by the camera of the vehicle 40. In this case, the region where the predetermined image quality can be obtained may be designated by a staff member or the like based on the image, or may be determined by the section information generation unit 251 based on the image.

Even in a case where the traveling road is an apron or a taxiway, similar section information is set or generated in advance.

The sign information storage unit 24 stores sign information. The sign information indicates information regarding the above-described signs. FIG. 6 is a diagram illustrating an example of sign information according to the first example embodiment.

As illustrated in FIG. 6, the sign information includes a traveling road type, a sign type, a transverse-direction length, a longitudinal-direction length, a repeated interval, and a sign image. The sign type indicates the type of sign on the traveling road. The transverse-direction length indicates a length of a sign in the transverse direction. The longitudinal-direction length indicates a length of a sign in the longitudinal direction. The repeated direction indicates, for example, a repeated direction (longitudinal direction or transverse direction) of signs repeatedly set on the traveling road, such as runway centerline signs. The repeated interval indicates a repeated interval between signs repeatedly set on the traveling road. The sign image indicates an image of a sign.

The sign is not limited to the above-described sign, and a structure or the like disposed on the traveling road or around the traveling road may be used as a sign. For example, when the traveling road type is an apron, a structure around the apron, such as an airport terminal or a gate, may be used as a sign. In this case, similar information is set for these structures and the like in the sign information.

The sign information may include an identification model (identifier) for identifying various signs from the image.

The abnormality detection unit 26 detects an abnormality based on each piece of sensor information acquired using a known technique, that is, detects and determines whether there is an abnormality on the traveling road and an abnormality type by analyzing the sensor information. For example, the road surface management device 20 analyzes image information included in the sensor information using an analysis model obtained by learning images of abnormalities of the traveling road through machine learning. Then, the abnormality detection unit 26 calculates a degree of deterioration for the detected abnormality of the traveling road. The abnormality detection unit 26 outputs an abnormality detection result to the detection result storage unit 27 as a detection result.

The detection result storage unit 27 stores the detection result output by the abnormality detection unit 26.

The display control unit 28 generates a detection result screen indicating the abnormality detection result, and causes the display device 30 or the terminal device 50 to display the abnormality detection result.

The transmission/reception unit 29 transmits the detection result display image to the terminal device 50.

As illustrated in FIG. 4, the terminal device 50 includes a transmission/reception unit 51, an image information acquisition unit 52, a display unit 53, an input unit 54, a section identification unit 55, a sign information storage unit 56, a section information storage unit 57, and a display control unit 58.

The transmission/reception unit 51 receives the detection result screen from the road surface management device 20.

The image information acquisition unit 52 acquires image information including a longitudinal-direction image and a transverse-direction image of the traveling road acquired by the main camera and the side camera of the vehicle 40.

Similarly to the section identification unit 23, the section identification unit 55 performs a section identification process using section information and sign information to identify a section in which the images included in the image information are captured, that is, a section in which the vehicle 40 (terminal device 50) is currently located.

The section information storage unit 57 stores section information that is the same as the section information stored in the section information storage unit 25.

The sign information storage unit 56 stores section information that is the same as the sign information stored in the sign information storage unit 24.

When the section information in the section information storage unit 25 or the sign information in the sign information storage unit 24 is updated, the road surface management device 20 may transmit the updated section information or sign information to the terminal device 50 such that the updated section information or sign information is stored in the section information storage unit 57 or the sign information storage unit 56.

The display control unit 58 causes the display unit 53 to display the detection result screen received from the road surface management device 20. In addition, the display control unit 58 displays the section identified by the section identification unit 55 as a section where the vehicle 40 is currently located in a map frame of the detection result screen.

The display unit 53 displays the detection result screen. The display unit 53 is, for example, a display device.

The input unit 54 receives an operation instruction from a staff member or the like. The input unit 54 is, for example, a touch panel provided on a surface of the display device.

Next, an operation according to the first example embodiment will be described.

Here, it is assumed that the traveling road is a runway, the section information storage unit 25 and the section information storage unit 57 store the section information indicating the positional relationships of FIG. 5, and the sign information storage unit 24 and the sign information storage unit 56 store the sign information of FIG. 6. In addition, it is assumed that the vehicle 40 acquires a longitudinal-direction image of the traveling road through the main camera and a transverse-direction image of the traveling road through the side camera while traveling on the traveling road in the longitudinal direction.

(Detection Result Display Process)

First, an abnormality detection process will be described. The detection result display process is a process of detecting an abnormality of a traveling road based on sensor information transmitted from each vehicle 40 and displaying a detection result.

Figure 7:
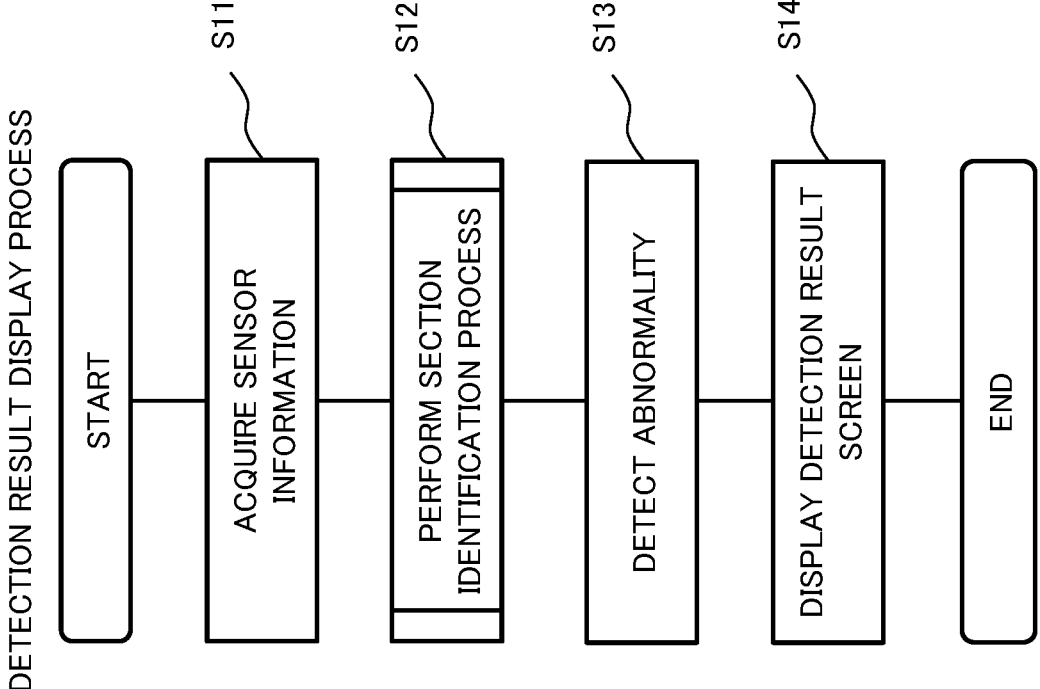
FIG. 7 is a flowchart illustrating a detection result display process of the road surface management system 10 according to the first example embodiment.

FIG. 7 is a flowchart illustrating a detection result display process of the road surface management system 10 according to the first example embodiment.

In the road surface management system 1, the sensor information acquisition unit 21 of the road surface management device 20 acquires sensor information (acquisition time, image information, and acceleration information) transmitted from the vehicle 40, for example, as illustrated in FIG. 2 (step S11). The sensor information acquisition unit 21 stores the acquired sensor information in the sensor information storage unit 22.

The section identification unit 23 performs a section identification process using section information and sign information with respect to each piece of the acquired sensor information (step S12). The section identification unit 23 sets the identified section as a section in which the sensor information is acquired.

Here, the section identification process (step S12) will be described in detail. First, a method of identifying a transverse-direction section in the section identification process will be described with reference to FIGS. 8 to 10.

For example, the transverse-direction section is identified based on a position of a predetermined transverse-direction reference sign in the longitudinal-direction image of the traveling road, using a relative distance in the transverse direction between the transverse-direction reference sign and the center of the image with respect to a known transverse-direction area length. Here, the transverse-direction reference sign is, for example, a sign that exists only at one place on a transverse-direction straight line of the traveling road. In a case where the traveling road is a runway, for example, the runway centerline sign of FIG. 5 or the like can be used as the transverse-direction reference sign. In addition, in a case where the traveling road is a taxiway, for example, a taxiway centerline sign or the like can be used, and in a case where the traveling road is an apron, for example, a guideline or the like can be used. Further, as the known transverse-direction area length, for example, a transverse-direction area length from the sign to an end of the traveling road or a transverse-direction length of the sign is used.

Figure 8:
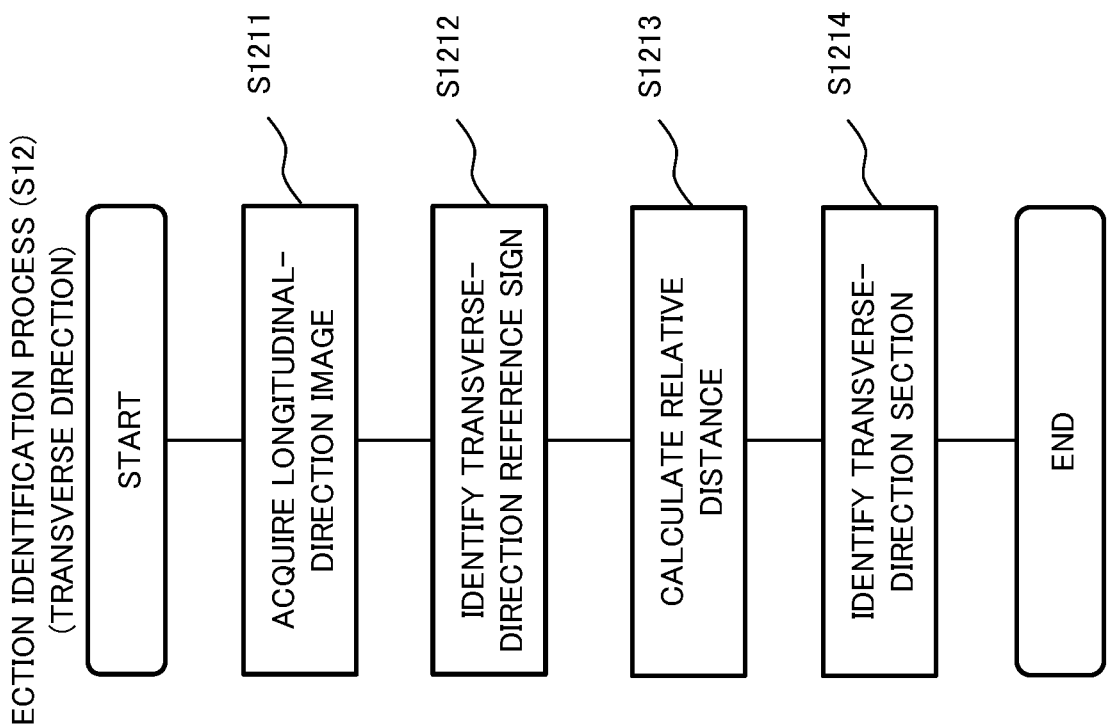
FIG. 8 is a flowchart illustrating a process of identifying a transverse-direction section in a section identification process (step S12) according to the first example embodiment.

FIG. 8 is a flowchart illustrating a process of identifying a transverse-direction section in the section identification process (step S12) according to the first example embodiment.

The section identification unit 23 acquires a longitudinal-direction image from the sensor information (step S1211).

The section identification unit 23 identifies a transverse-direction reference sign from the acquired image (step S1212). The sign is identified, for example, by pattern matching with an image of the sign included in the sign information or by using an identification model (identifier).

The section identification unit 23 calculates a relative distance between the transverse-direction reference sign and the center of the image with respect to the known transverse-direction area length (step S1213). Here, in a case where a transverse-direction length of the transverse-direction reference sign is used as the known transverse-direction area length, the section identification unit 23 acquires the transverse-direction length from the sign information.

The section identification unit 23 identifies a transverse-direction section in which the image is captured, using the section information, the position of the transverse-direction reference sign in the image, and the calculated relative distance (step S1214). Here, in the section information, the section identification unit 23 identifies a position spaced apart by a relative distance in the transverse direction from the position of the transverse-direction reference sign in the image. Then, the section identification unit 23 identifies a transverse-direction section including the identified position in the section information.

Figure 9:
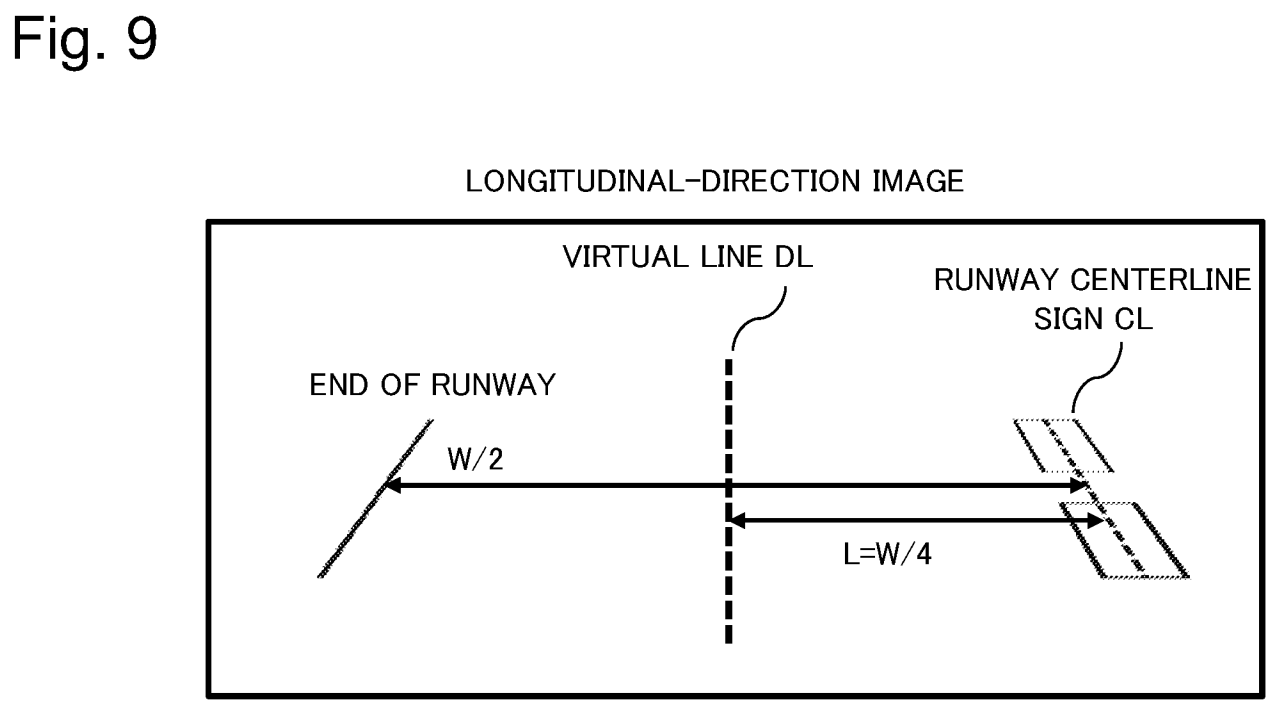

FIG. 9 is a diagram illustrating an example of a method of identifying a transverse-direction section according to the first example embodiment. In the example of FIG. 9, a runway centerline sign is used as the transverse-direction reference sign, and an area from the runway centerline sign to the end of the runway is used as the known transverse-direction area length.

In this case, the section identification unit 23 identifies a runway centerline sign CL from the image. In the image, the section identification unit 23 compares a distance L in the transverse direction from the runway centerline sign CL to a virtual line DL at the center of the image with a distance between the runway centerline sign CL and an area at the end of the runway (W/2, which is ½ of the transverse-direction length of the runway), and calculates the distance L as (½)× (W/2)=W/4. Then, in the section information of FIG. 5, the section identification unit 23 identifies a position spaced apart from the runway centerline sign CL in the transverse direction by the distance L=W/4, and identifies a transverse-direction section including the identified position as b.

Figure 10:
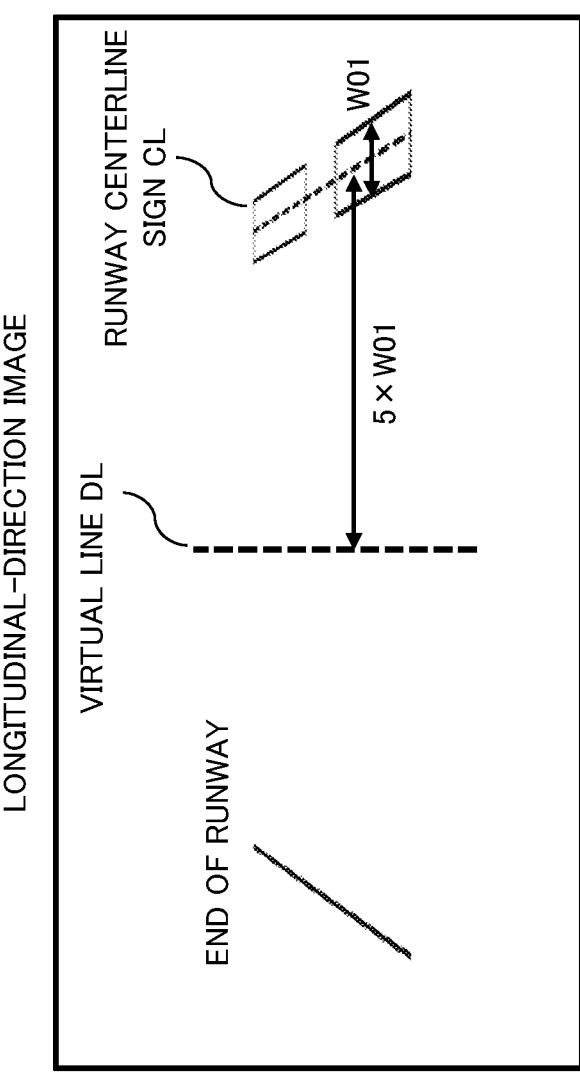
FIG. 10 is a diagram illustrating another example of a method of identifying a transverse-direction section according to the first example embodiment.

FIG. 10 is a diagram illustrating another example of a method of identifying a transverse-direction section according to the first example embodiment. In the example of FIG.

10, a runway centerline sign is used as the transverse-direction reference sign, and a transverse-direction length of the runway centerline sign to the end of the runway is used as the known transverse-direction area length.

In this case, the section identification unit 23 identifies a runway centerline sign CL from the image. The section identification unit 23 acquires a transverse-direction length W01 of the runway centerline sign CL from the sign information of FIG. 6. In the image, the section identification unit 23 compares a distance L in the transverse direction from the runway centerline sign CL to the virtual line DL at the center of the image with the transverse-direction length W01 of the runway centerline sign CL, and calculates the distance L as 5×W01. Then, in the section information of FIG. 5, the section identification unit 23 identifies a position spaced apart from the runway centerline sign CL by the distance L=5×W01, and identifies a transverse-direction section including the identified position as b.

Next, a method of identifying a longitudinal-direction section in the section identification process will be described with reference to FIGS. 11 to 13.

For example, the longitudinal-direction section is identified based on a position of a predetermined longitudinal-direction reference sign in the transverse-direction image of the traveling road, using a relative distance in the longitudinal direction between the longitudinal-direction reference sign and the center of the image with respect to a known longitudinal-direction area length. Here, the longitudinal-direction reference sign is, for example, a sign that exists only at one place on a longitudinal-direction straight line of the traveling road. In a case where the traveling road is a runway, for example, the indicator sign of FIG. 5 or the like can be used as the longitudinal-direction reference sign. In addition, in a case where the traveling road is a taxiway, for example, a stop position guide sign or the like can be used, and in a case where the traveling road is an apron, for example, a spot number or the like can be used. In addition, for example, a longitudinal-direction length of a sign or a repeated interval between signs repeatedly provided in the longitudinal direction is used as a known longitudinal-direction area length.

Figure 11:
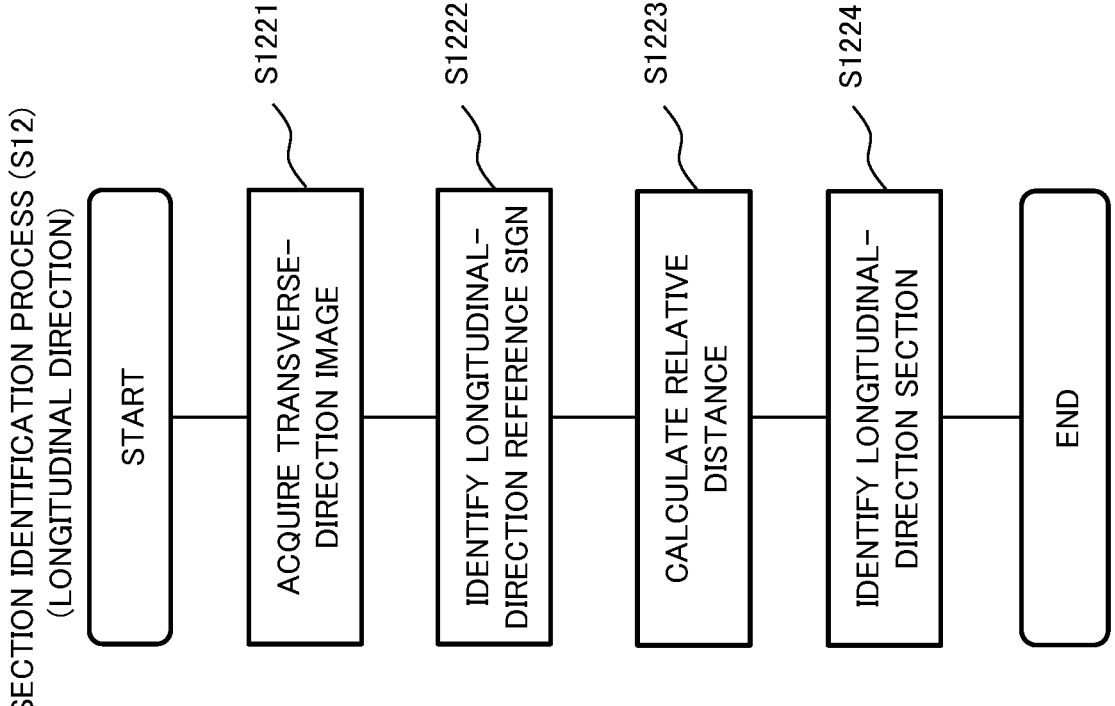
FIG. 11 is a flowchart illustrating a process of identifying a longitudinal-direction section in the section identification process (step S12) according to the first example embodiment.

FIG. 11 is a flowchart illustrating a process of identifying a longitudinal-direction section in the section identification process (step S12) according to the first example embodiment.

The section identification unit 23 acquires a transverse-direction image from the sensor information (step S1221).

The section identification unit 23 identifies a longitudinal-direction reference sign from the acquired image (step S1222). Here, similarly to the step S1212, the section identification unit 23 identifies a longitudinal-direction reference sign.

The section identification unit 23 calculates a relative distance between the longitudinal-direction reference sign and the center of the image with respect to the known longitudinal-direction area length (step S1223). Here, in a case where a longitudinal-direction length of each of signs repeatedly provided in the longitudinal direction, a repeated interval between the signs repeatedly provided in the longitudinal direction, or a longitudinal-direction length of the longitudinal-direction reference sign is used as the known longitudinal-direction area length, the section identification unit 23 acquires the longitudinal-direction length or the repeated interval from the sign information.

The section identification unit 23 identifies a longitudinal-direction area in which the image is captured, using the section information, the position of the longitudinal-direction reference sign in the image, and the calculated relative distance (step S1224). Here, in the section information, the section identification unit 23 identifies a position spaced apart by a relative distance in the longitudinal direction from the position of the longitudinal-direction reference sign in the image. Then, the section identification unit 23 identifies a longitudinal-direction section including the identified position in the section information.

Figure 12:
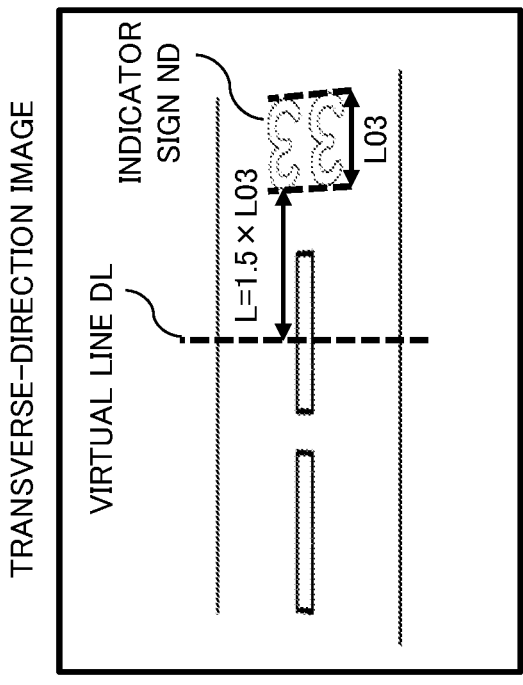
FIG. 12 is a diagram illustrating an example of a method of identifying a longitudinal-direction section according to the first example embodiment.

FIG. 12 is a diagram illustrating an example of a method of identifying a longitudinal-direction section according to the first example embodiment. In the example of FIG. 11, an indicator sign is used as the longitudinal-direction reference sign, and a longitudinal-direction length of the indicator sign is used as the known longitudinal-direction area length.

In this case, the section identification unit 23 identifies an indicator sign ND from the image. The section identification unit 23 acquires a longitudinal-direction length L03 of the indicator sign ND from the sign information of FIG. 6. In the image, the section identification unit 23 compares a distance L in the longitudinal direction from the indicator sign ND to a virtual line (dotted line DL) at the center of the image with the longitudinal-direction length (L03) of the indicator sign, and calculates the distance L as 1.5×L03. Then, in the section information of FIG. 5, the section identification unit 23 identifies a position spaced apart from the indicator sign ND in the longitudinal direction by the distance L=1.5×L03, and identifies a longitudinal-direction section including the identified position as 03.

Figure 13:
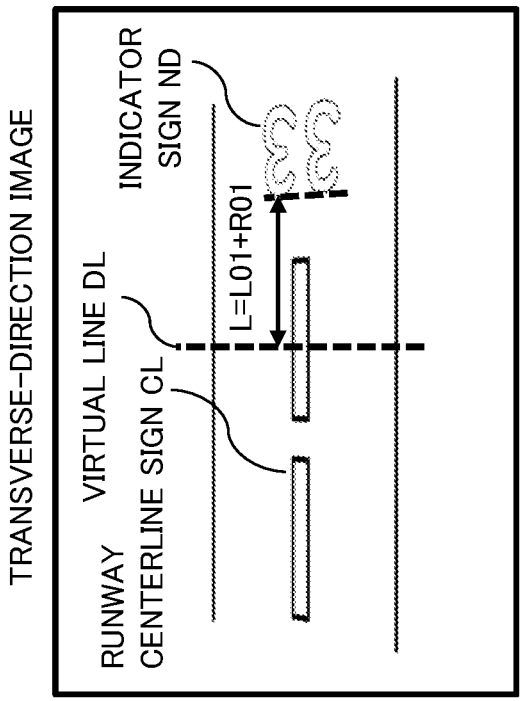
FIG. 13 is a diagram illustrating another example of a method of identifying a longitudinal-direction section according to the first example embodiment.

FIG. 13 is a diagram illustrating another example of a method of identifying a longitudinal-direction section according to the first example embodiment. In the example of FIG. 13, an indicator sign is used as the longitudinal-direction reference sign, and a longitudinal-direction length of a runway centerline sign and a repeated interval between runway centerline sign are used as the known longitudinal-direction area length.

In this case, the section identification unit 23 identifies the indicator sign ND and the runway centerline signs CL from the image. The section identification unit 23 acquires a longitudinal-direction length L01 of the runway centerline sign CL and a repeated interval R01 between the runway centerline signs CL from the sign information of FIG. 6. The section identification unit 23 compares a distance L in the longitudinal direction from the indicator sign ND to a virtual line DL at the center of the image with the longitudinal-direction length L01 of the runway centerline sign CL and the repeated interval R01 between the runway centerline signs CL in the image, and calculates the distance L as L01+R01. Then, in the section information of FIG. 5, the section identification unit 23 identifies a position spaced apart from the indicator sign ND in the longitudinal direction by the distance L=L01+R01, and identifies a longitudinal-direction section including the identified position as 03.

When no predetermined longitudinal-direction reference sign exists in the image, the section identification unit 23 may use a composite image obtained by joining images captured at one or more acquisition times before or after an image from which a section is to be identified in the longitudinal direction until the longitudinal-direction reference sign appears. In this case, a longitudinal-direction section is identified by performing the process of FIG. 12 or 13 based on the predetermined longitudinal-direction reference sign using the composite image.

The section identification unit 23 identifies a section in which the image is captured as, for example, RW03*b* through the transverse-direction and longitudinal-direction section identification processes.

Note that, although it has been described above that the longitudinal-direction image is used to identify the transverse-direction section, and the transverse-direction image is used to identify the longitudinal-direction section, the present disclosure is not limited thereto, and a transverse-direction image may be used to identify a transverse-direction section, and a longitudinal-direction image may be used to identify a longitudinal-direction section.

Next, the abnormality detection unit 26 detects an abnormality of the traveling road with respect to each piece of the acquired sensor information (step S13). Here, the abnormality detection unit 26 generates a detection result by associating the sensor information with detection information. For example, the abnormality detection unit 26 generates a detection result as illustrated in FIG. 3. The abnormality detection unit 26 stores the generated detection result in the detection result storage unit 27.

Figure 14:
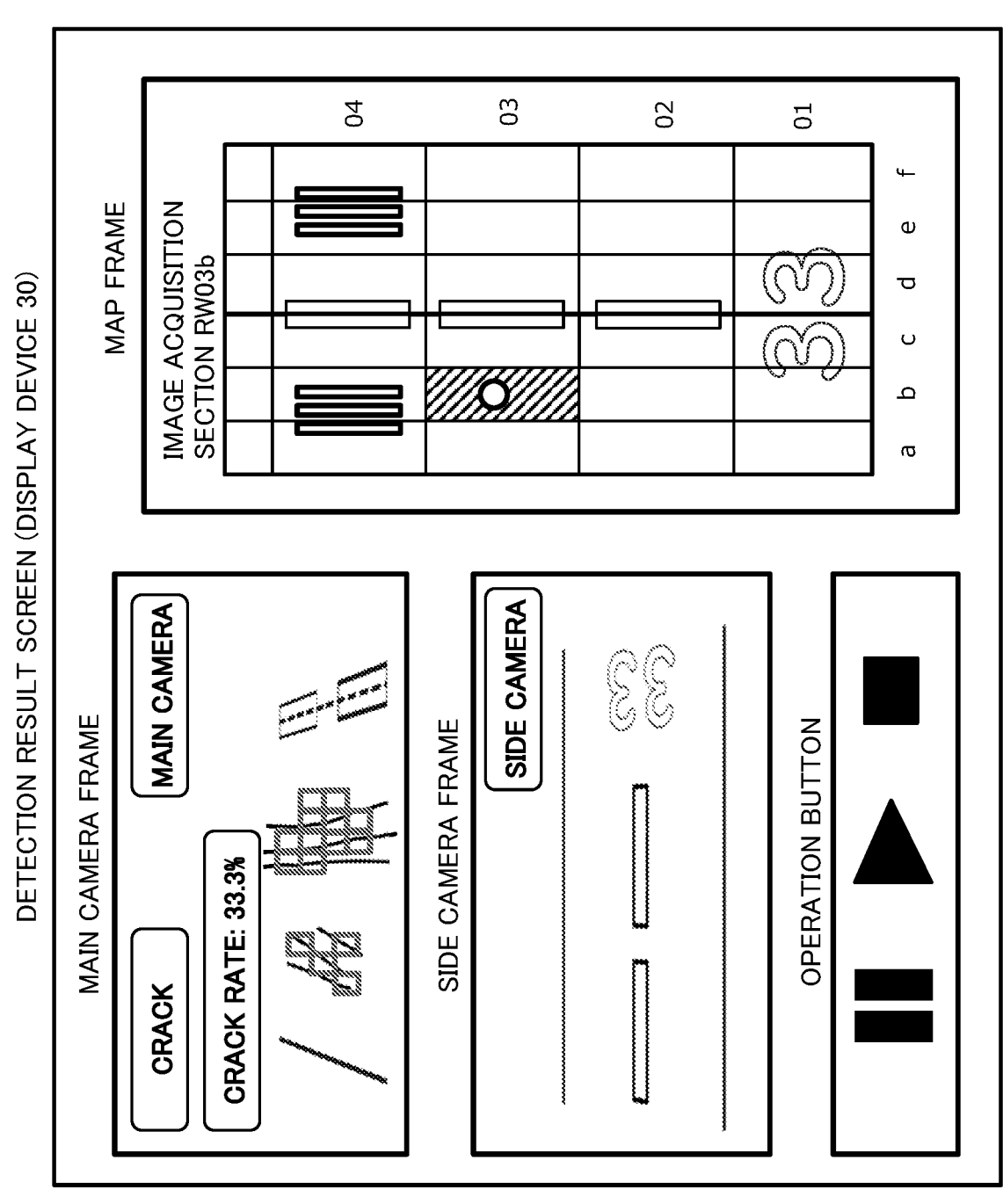
FIG. 14 is a diagram illustrating an example of a detection result screen displayed on a display device 30 according to the first example embodiment.

Next, the display control unit 28 causes the display device 30 to display a detection result screen based on the detection result (step S14). FIG. 14 is a diagram illustrating an example of a detection result screen displayed on the display device 30 according to the first example embodiment. In the example of FIG. 14, the detection result screen includes a main camera frame, a side camera frame, a map frame, and operation buttons. In the main camera frame, a longitudinal-direction image captured by the main camera of the vehicle 40 is displayed. In the side camera frame, a transverse-direction image captured by the side camera is displayed. In the map frame, a map of the traveling road divided into a plurality of sections is displayed. The operation buttons (a temporary stop button, a play button, a stop button, etc.) are used to operate the display of images to be displayed in the main camera frame and the side camera frame in order of acquisition time (the display of moving images).

In a case where the main camera is a 360-degree camera, an image in a desired direction may be displayed in the main camera frame, for example, according to a rotation operation of a staff member. Furthermore, in a case where the main camera is a 360-degree camera, each of the main camera frame and the side camera frame may be divided into two parts, and a traveling-direction image and a backward-direction image may be displayed in the two parts of the main camera frame, respectively, and a left-side image and a right-side image in the traveling direction may be displayed in the two parts of the side camera frame, respectively.

The display control unit 28 displays the images included in the sensor information of the detection result in the main camera frame and the side camera frame, for example, according to an operation of an operation button by a staff member or the like. At this time, the display control unit 28 highlights a section in which the displayed image is acquired on the map frame. For example, the display control unit 28 displays a predetermined icon in the acquisition section on the map frame. In addition, the display control unit 28 may color the section in which the image is acquired or blink the acquisition section. In the example of FIG. 14, a white circle icon is displayed in the section RW03*b* in which the displayed image is acquired.

Note that, in a case where a section is designated on the map frame by a staff member or the like, the display control unit 28 may display the images of the sensor information in which the designated section is set as an acquisition section in the detection result in the main camera frame and the side camera frame.

In addition, the display control unit 28 highlights an acquisition section of the sensor information in which an abnormality is detected on the map frame based on the detection result. Here, the display control unit 28 may highlight the acquisition section in which the abnormality is detected according to a detection type. For example, the display control unit 28 displays a predetermined icon corresponding to the type of abnormality in the acquisition section in which the abnormality is detected. In addition, the display control unit 28 may color the acquisition section in which the abnormality is detected or blink the acquisition section. In the example of FIG. 14, the section RW03*b* in which the abnormality is detected is indicated by hatching. Further, the display control unit 28 may highlight the acquisition section in which the abnormality is detected according to a detection state. For example, the display control unit 28 displays an icon or a color to be displayed in the acquisition section in which the abnormality is detected in a different color such as blue, red, or yellow according to the detection state (a crack rate or the like). As a result, a staff member or the like can visually grasp at a glance the section where the abnormality is detected on the traveling road, the detection type, and the detection state.

When an abnormality is detected in the sensor information of the displayed image from the detection result, the display control unit 28 displays detection information (detection type, detection state, and the like) on the detection result screen. Here, the display control unit 28 may display the detection result to be overlaid on the image. Furthermore, in a case where an abnormality is detected by analyzing the image information, the display control unit 28 may indicate a location where the abnormality is detected on the image. In the example of FIG. 14, on the image in the main camera frame where the abnormality is detected, while the detection type "crack" and the detection state "crack rate: 33.3%" are displayed, and a location where the crack is detected is indicated.

In addition, regardless of whether an abnormality is detected in the sensor information of the displayed image, the display control unit 28 may display, on the detection result screen, an index related to a degree of deterioration (crack rate, IRI, MCI, or the like) included in the detection state of the detection result.

In a case where the camera of the vehicle 40 is only the main camera, only an image captured by the main camera is displayed on the detection result screen.

A staff member or the like can grasp a section where the abnormality is detected on the traveling road by checking the detection result screen as illustrated in FIG. 14.
(Current Section Display Process)

Next, a current section display process will be described. The current section display process is a process of identifying and displaying a section in which the vehicle 40 is currently located when a staff member or the like goes to a point where an abnormality is detected on the traveling road using the vehicle 40.

Figure 15:
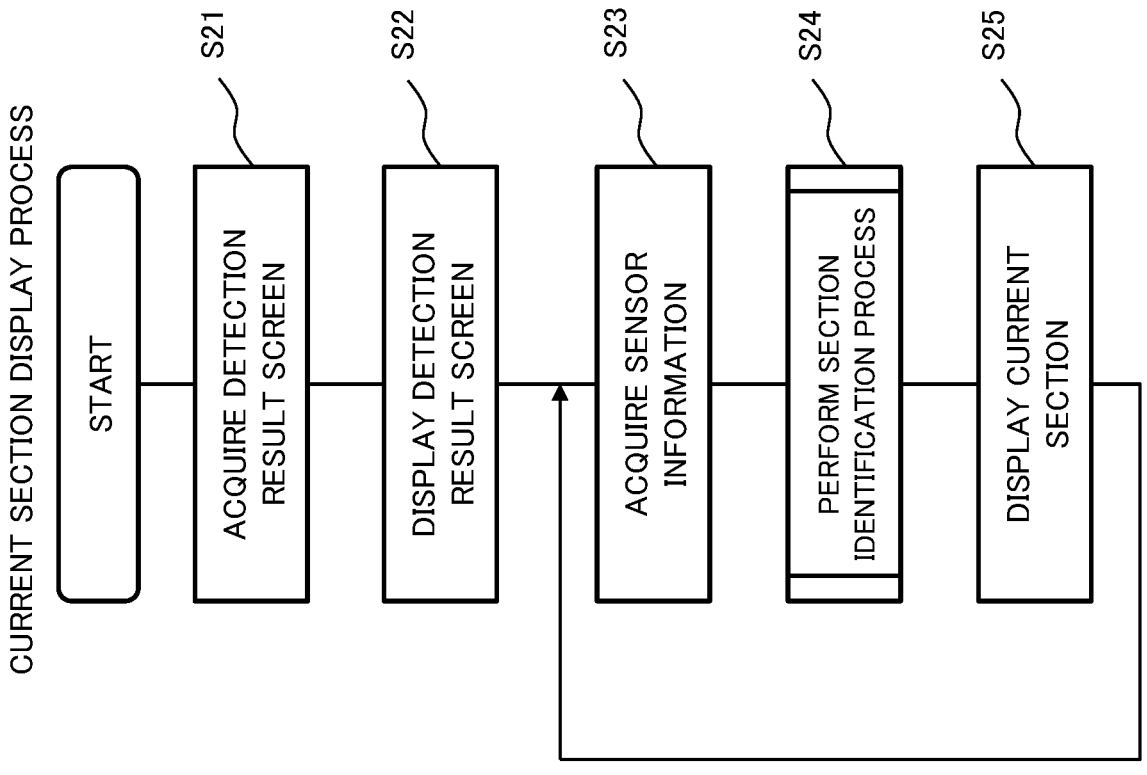
FIG. 15 is a flowchart illustrating a current section display process of the road surface management system 10 according to the first example embodiment.

FIG. 15 is a flowchart illustrating a current section display process of the road surface management system 10 according to the first example embodiment.

The display control unit 58 of the terminal device 50 acquires a detection result screen from the road surface management device 20 according to an operation of a staff member or the like (step S21). The display control unit 28 of the road surface management device 20 transmits the detection result screen to the terminal device 50 in response to a request from the terminal device 50. The detection result screen is displayed on the display unit 53 via the transmission/reception unit 29, the transmission/reception unit 51, and the display control unit 58.

The display control unit 58 causes the display unit 53 to display the received detection result screen (step S22). Here, similarly to the step S14 described above, the display control unit 28 of the road surface management device 20 displays the image included in the sensor information, the section in which the abnormality is detected, and the abnormality detection result (detection type, detection state, and the like) on the detection result screen according to an operation of an operation button by a staff member or the like. The operation of the operation button by the staff member or the like is input to the display control unit 28 via the input unit 54, the transmission/reception unit 51, and the transmission/reception unit 29.

The image information acquisition unit 52 acquires image information including a longitudinal-direction image and a transverse-direction image of the traveling road (step S23).

The section identification unit 55 performs a section identification process using section information and sign information with respect to the acquired image information (step S24). The section identification unit 55 identifies a section in which the vehicle 40 is currently located through the section identification process.

The display control unit 58 displays the section identified by the section identification unit 55 as a section where the vehicle 40 is currently located in a map frame of the detection result screen (step S25). Here, the display control unit 58 highlights the section where the vehicle 40 is currently located on the map frame. For example, the display control unit 58 may display a predetermined icon in the section where the vehicle 40 is currently located on the map frame as highlighting the section where the vehicle 40 is currently located. In addition, the display control unit 58 may color or blink the section where the vehicle 40 is currently located.

Figure 16:
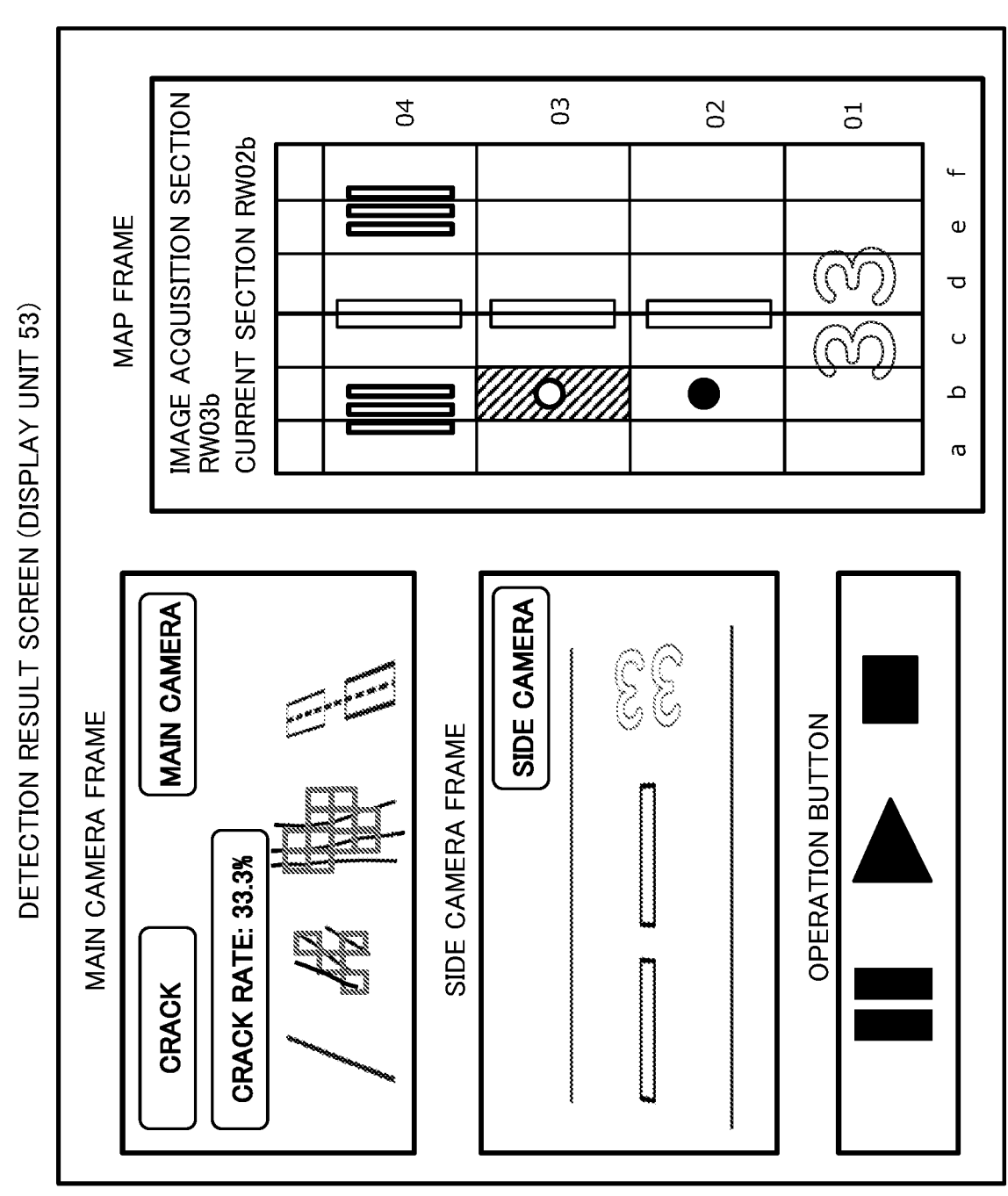
FIG. 16 is a diagram illustrating an example of a detection result screen displayed on a display unit 53 according to the first example embodiment.

FIG. 16 is a diagram illustrating an example of a detection result screen displayed on the display unit 53 according to the first example embodiment. In the example of FIG. 16, in the map frame of the detection result screen similar to that of FIG. 14, a black circle icon is displayed in a section RW02b where the vehicle 40 is currently located.

Thereafter, the process from the step S23 is repeated. As a result, as the vehicle 40 moves, the section indicated in the map frame of the detection result screen as a section in which the vehicle 40 is currently located also changes. Then, a staff member or the like can reach a section where the abnormality is detected on the traveling road by checking the detection result screen as illustrated in FIG. 16.

As described above, the operation according to the first example embodiment is completed.

It has been described above that the terminal device 50 is mounted on the vehicle 40, and a section where the vehicle 40 (terminal device 50) is currently located is identified using images acquired by the main camera and the side camera of the vehicle 40. However, the present disclosure is not limited thereto, and in a case where the terminal device 50 is a tablet or a smartphone carried by a staff member, a section where the vehicle 40 (terminal device 50) is currently located may be identified using images acquired by a camera of the terminal device 50. In this case, a longitudinal-direction image and a transverse-direction image may be acquired while the staff member orients the camera of the terminal device 50 in the longitudinal direction and the transverse direction of the traveling road.

Furthermore, the terminal device 50 may not be mounted on the vehicle 40. In this case, the terminal device 50 may identify a section in which the terminal device 50 is currently located using an image acquired by the camera of the terminal device 50.

Further, the road surface management device 20 and the terminal device 50 may identify a section where the image is captured using a position information acquisition device provided in the vehicle 40, such as a GPS, together. In this case, the vehicle 40 transmits, to the road surface management device 20, sensor information including position information acquired by the position information acquisition device. For example, the road surface management device 20 and the terminal device 50 identify an approximate position of the section in which the image is captured based on the position information acquired by the position information acquisition device and the section information, and identify a final position of the section based on images captured by the cameras of the vehicle 40. As a result, the road surface management device 20 and the terminal device 50 can identify a section where an image is captured with higher accuracy.

Effects of First Example Embodiment

According to the first example embodiment, it is possible to manage a traveling road of an airport so that an abnormality-detected position can be easily identified on the traveling road with high accuracy. This is because the section identification unit 23 of the road surface management device 20 identifies a section in which an image is captured, among a plurality of sections obtained by dividing the traveling road of the airport, based on positional relationships between the plurality of sections and signs, and signs in the image included in sensor information collected on the traveling road, the abnormality detection unit 26 detects an abnormality of the traveling road in the identified section based on the collected sensor information, and the display control unit 28 outputs the detected abnormality in association with the identified section.

Second Example Embodiment

A second example embodiment will be described.

Figure 17:
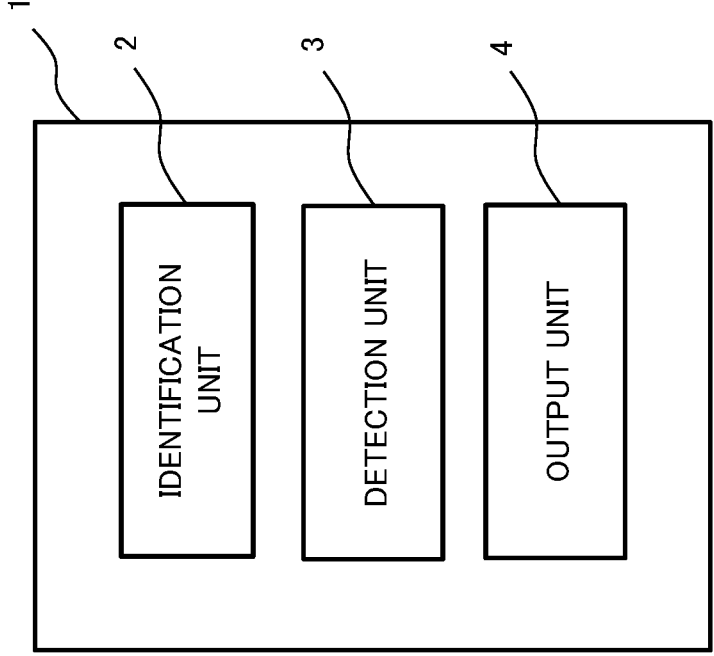
FIG. 17 is a block diagram illustrating a configuration of a road surface management device 1 according to a second example embodiment.

FIG. 17 is a block diagram illustrating a configuration of a road surface management device 1 according to a second example embodiment. The road surface management device 1 includes an identification unit 2, a detection unit 3, and an output unit 4. The identification unit 2, the detection unit 3, and the output unit 4 are example embodiments of the identification means, the detection means, and the output means according to the present disclosure, respectively. The identification unit 2, the detection unit 3, and the output unit 4 correspond to the section identification unit 23, the abnormality detection unit 26, and the display control unit 28 according to the first example embodiment, respectively.

Based on positional relationships between a plurality of sections obtained by dividing a traveling road of an airport and signs, and signs in an image included in sensor information collected on the traveling road, the identification unit 2 identifies a section where the image is captured among the plurality of sections. The identification unit 2 identifies a section, for example, based on preset positional relationships and sensor information acquired from a vehicle that captures an image of a traveling road while traveling on the traveling road and collects sensor information including the image.

The detection unit 3 detects an abnormality of the traveling road in the identified section based on the collected sensor information. The detection unit 3 detects an abnormality by analyzing the sensor information, for example, using an analysis model.

The output unit 4 outputs the detected abnormality in association with the identified section. The output unit 4 causes, for example, a display device or the like to display the detected abnormality.

Effects of Second Example Embodiment

According to the second example embodiment, it is possible to manage a traveling road of an airport so that an abnormality-detected position can be easily identified on the traveling road with high accuracy. This is because the identification unit 2 of the road surface management device 1 identifies a section in which an image is captured, among a plurality of sections obtained by dividing the traveling road of the airport, based on positional relationships between the plurality of sections and signs, and signs in the image included in sensor information collected on the traveling road, the detection unit 3 detects an abnormality of the traveling road in the identified section based on the collected sensor information, and the output unit 4 outputs the detected abnormality in association with the identified section.

(Hardware Configuration)

In each of the above-described embodiments, each component of the road surface management device 20 and the terminal device 50 represents a functional unit block. Some or all of each component of each device may be achieved by any combination of a computer 500 and a program.

Figure 18:
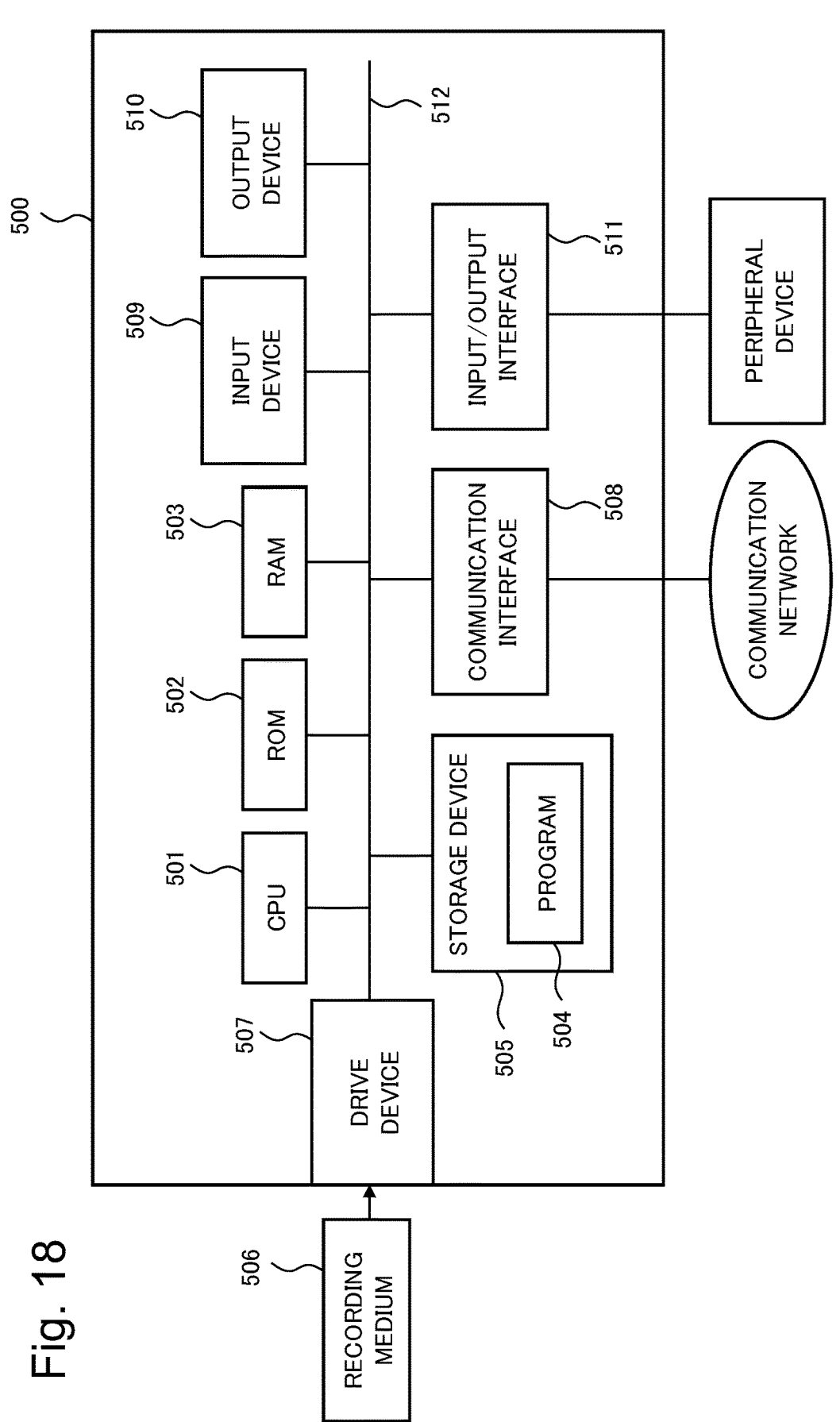
FIG. 18 is a block diagram illustrating an example of a hardware configuration of a computer 500.

FIG. 18 is a block diagram illustrating an example of a hardware configuration of the computer 500. Referring to FIG. 18, the computer 500 includes, for example, a central processing unit (CPU) 501, a read only memory (ROM) 502, a random access memory (RAM) 503, a program 504, a storage device 505, a drive device 507, a communication interface 508, an input device 509, an output device 510, an input/output interface 511, and a bus 512.

The program 504 includes instructions for implementing each function of each device. The program 504 is stored in advance in the ROM 502, the RAM 503, or the storage device 505. The CPU 501 implements each function of each device by executing the instructions included in the program 504. For example, the CPU 501 of the road surface management device 20 implements the functions of the sensor information acquisition unit 21, the section identification unit 23, the abnormality detection unit 26, the display control unit 28, and the transmission/reception unit 29 by executing the introductions included in the program 504. In addition, for example, the RAM 503 of the road surface management device 20 may store data of the section information storage unit 25. In addition, for example, the storage device 505 of the road surface management device 20 may store data of the sensor information storage unit 22, the sign information storage unit 24, and the detection result storage unit 27.

The drive device 507 performs reading and writing from and to the recording medium 506. The communication interface 508 provides an interface with a communication network. The input device 509 is, for example, a mouse, a keyboard, or the like, and receives an input of information from an operator or the like. The output device 510 is, for example, a display, and outputs (displays) information to an operator or the like. The input/output interface 511 provides an interface with a peripheral device. The bus 512 connects the components of the hardware to each other. The program

504 may be supplied to the CPU 501 via the communication network, or may be stored in the recording medium 506 in advance, read by the drive device 507, and supplied to the CPU 501.

Note that the hardware configuration illustrated in FIG. 18 is an example, and other components may be added or some components may not be included.

The method for implementing the road surface management device 20 and the terminal device 50 may be modified in various manners. For example, each component of the road surface management device 20 may be implemented by any combination of a program with a different computer. In addition, a plurality of components included in each of the devices may be implemented by any combination of a program with one computer.

In addition, some or all of the components of each device may be implemented by general-purpose or dedicated circuitry including a processor or the like, or a combination thereof. These circuits may be configured by a single chip or may be configured by a plurality of chips connected to each other via a bus. Some or all of each component of each device may be implemented by a combination of a program with the above-described circuits or the like.

In addition, in a case where some or all of the components of each device are implemented by a plurality of computers, circuits, or the like, the plurality of computers, circuits, or the like may be arranged in a centralized manner or in a distributed manner.

While the present disclosure has been particularly shown and described with reference to example embodiments thereof, the present disclosure is not limited to these example embodiments. It will be understood by those skilled in the art that various modifications may be made to the configuration of the present disclosure within the scope of the present disclosure. In addition, the configurations according to the respective example embodiments can be combined with each other without departing from the scope of the present disclosure.

REFERENCE SIGNS LIST

1, 20 Road surface management device
2 Identification unit
3 Detection unit
4 Output unit
10 Road surface management system
21 Sensor information acquisition unit
22 Sensor information storage unit
23, 55 Section identification unit
24, 56 Sign information storage unit
25, 57 Section information storage unit
251 Section information generation unit
26 Abnormality detection unit
27 Detection result storage unit
28, 58 Display control unit
29, 51 Transmission/reception unit
30 Display device
40 Vehicle
50 Terminal device
52 Image information acquisition unit
53 Display unit
54 Input unit
500 Computer
501 CPU
502 ROM
503 RAM
504 Program 505 Storage device
506 Recording medium
507 Drive device
508 Communication interface
509 Input device
510 Output device
511 Input/output interface
512 Bus

What is claimed is:

1. A road surface management device comprising:
at least one memory configured to store instructions; and
at least one processor configured to execute the instructions to:
acquire sensor information, the sensor information comprising images of a traveling road associated with an airport captured by an image sensor mounted on a moving object;
identify a stored sign among a plurality of signs from stored section information corresponding to a sign detected in the images based on image analysis, the section information indicating positional relationships between a plurality of sections and signs, the plurality of sections being based on a division of the traveling road associated with the airport;
calculate a relative distance between the identified sign detected and a center of the acquired image based on a known area length;
identify a section in which the images are captured, among the plurality of sections, based on positional relationships between the plurality of sections and the signs, the calculated distance, and global positioning system (GPS) information;
detect an abnormality of the traveling road in the identified section based on the sensor information using an analysis model trained to recognize road surface abnormalities; and
transmit a control signal to a display device to output the detected abnormality and the identified section.

2. The road surface management device according to claim 1, wherein the plurality of sections are set by dividing based on the division of the traveling road in a longitudinal direction and in a transverse direction, the longitudinal direction being a traveling direction on the traveling road and the transverse direction being a direction perpendicular to the traveling direction, and
wherein the at least one processor is further configured to execute the instructions to:
identify a transverse-direction section in which an image is captured based on the image in the longitudinal direction, and
identify a longitudinal-direction section in which the image is captured based on an image in the transverse direction.

3. The road surface management device according to claim 2, wherein the at least one processor is further configured to execute the instructions to:
identify the transverse-direction section in which the image is captured, using a position of a predetermined sign among signs in the image in the longitudinal direction, and a predetermined area of which a transverse-direction length is given in the image.

4. The road surface management device according to claim 2, wherein the at least one processor is further configured to execute the instructions to:
identify the longitudinal-direction section in which the image is captured, using a position of a predetermined sign among signs in the image in the transverse direction, and a predetermined area of which a longitudinal-direction length is given in the image.

5. The road surface management device according to claim 1, wherein the at least one processor is further configured to execute the instructions to:
generate the section information by dividing the traveling road into the plurality of sections based on an image of the traveling road, and extracting the positional relationships between the plurality of sections and the signs.

6. The road surface management device according to claim 5, wherein the at least one processor is further configured to execute the instructions to:
generate the section information by setting a size of the section based on a region where predetermined image quality is obtainable in the image included in the sensor information collected on the traveling road.

7. The road surface management device according to claim 1, wherein the at least one processor is further configured to execute the instructions to:
output the detected abnormality in association with the identified section to a terminal device,
the terminal device:
identifying a section in which an image is captured among the plurality of sections, based on the relationships between the plurality of sections and the signs, and signs in the image captured by the terminal device or a moving object on which the terminal device is mounted, and
displaying the section in which the image is captured and the section in which the abnormality is detected in the plurality of sections.

8. A road surface management method comprising:
acquiring sensor information, the sensor information comprising images of a traveling road associated with an airport captured by an image sensor mounted on a moving object;
identifying a stored sign among a plurality of signs from stored section information corresponding to a sign detected in the images based on image analysis, the section information indicating positional relationships between a plurality of sections and signs, the plurality of sections being based on a division of the traveling road associated with the airport;
calculating a relative distance between the identified sign detected and a center of the acquired image based on a known area length;
identifying a section in which the images are captured, among the plurality of sections, based on positional relationships between the plurality of sections and the signs, the calculated distance, and global positioning system (GPS);
detecting an abnormality of the traveling road in the identified section based on the sensor information using an analysis model trained to recognize road surface abnormalities; and
transmitting a control signal to a display device to output the detected abnormality and the identified section.

9. A recording medium recording a program for causing a computer to execute:
acquiring sensor information, the sensor information comprising images of a traveling road associated with an airport captured by an image sensor mounted on a moving object;
identifying a stored sign among a plurality of signs from stored section information corresponding to a sign detected in the images based on image analysis, the section information indicating positional relationships between a plurality of sections and signs, the plurality of sections being based on a division of the traveling road associated with the airport;

calculating a relative distance between the identified sign detected and a center of the acquired image based on a known area length;

identifying a section in which the images are captured, among the plurality of sections, based on the positional relationships between the plurality of sections and the signs, the calculated distance, and global positioning system (GPS) information;

detecting an abnormality of the traveling road in the identified section based on the sensor information using an analysis model trained to recognize road surface abnormalities; and transmitting a control signal to a display device to output the detected abnormality and the identified section.

\* \* \* \* \*